(12) United States Patent
Flemming et al.

(10) Patent No.: US 8,727,723 B2
(45) Date of Patent: May 20, 2014

(54) RECEPTOR FOR WIND TURBINE BLADE LIGHTNING PROTECTION

(75) Inventors: Matthew Flemming, Medina, OH (US); Matthew Caie, Aurora, OH (US); Ethan Kay, Auburn, OH (US); Nicholas J. Ambrogio, Highland Heights, OH (US)

(73) Assignee: ERICO International Corporation, Solon, OH (US)

( * ) Notice: Subject to any disclaimer, the term of this patent is extended or adjusted under 35 U.S.C. 154(b) by 489 days.

(21) Appl. No.: 13/176,922

(22) Filed: Jul. 6, 2011

(65) Prior Publication Data

US 2012/0020791 A1    Jan. 26, 2012

Related U.S. Application Data

(60) Provisional application No. 61/366,996, filed on Jul. 23, 2010.

(51) Int. Cl.
*F01D 5/14* (2006.01)
*F03D 9/00* (2006.01)

(52) U.S. Cl.
USPC .......................................... 416/1; 416/146 R

(58) Field of Classification Search
USPC ............................ 416/146 R, 1; 361/216, 218
See application file for complete search history.

(56) References Cited

U.S. PATENT DOCUMENTS

| | | | |
|---|---|---|---|
| 4,486,805 A * | 12/1984 | Cline | 361/133 |
| 6,407,900 B1 | 6/2002 | Shirakawa et al. | |
| 6,457,943 B1 | 10/2002 | Olsen et al. | |
| 6,612,810 B1 | 9/2003 | Olsen et al. | |
| 6,979,179 B2 | 12/2005 | Moller Larsen | |
| 7,040,864 B2 | 5/2006 | Johansen et al. | |
| 7,186,086 B2 | 3/2007 | Yoshida | |
| 7,249,935 B2 | 7/2007 | Pederson | |
| 7,377,750 B1 | 5/2008 | Costin et al. | |
| 7,390,169 B2 | 6/2008 | Larsen et al. | |
| 2003/0170122 A1 | 9/2003 | Wobben | |
| 2006/0013695 A1 | 1/2006 | Pedersen | |
| 2006/0126252 A1 | 6/2006 | Mortensen | |

(Continued)

FOREIGN PATENT DOCUMENTS

| | | |
|---|---|---|
| CN | 2720685 Y | 8/2005 |
| CN | 101207270 A | 6/2008 |

(Continued)

OTHER PUBLICATIONS

International Search Report and Written Opinion from corresponding International Application No. PCT/US11/43003.

*Primary Examiner* — Edward Look
*Assistant Examiner* — William Grigos
(74) *Attorney, Agent, or Firm* — Renner, Otto, Boisselle & Sklar, LLP

(57) ABSTRACT

A receptor assembly for lightning protection of an object, such as a wind turbine blade, includes a receptor disk configured to be placed on a surface of the object, a receptor block insulator with an integral receptor block, a cover that engages the receptor block insulator, and a cap that engages the cover. The receptor disk and the receptor block may be made of electrically conductive materials, and the cover, and the cap, and the receptor block insulator may define a chamber among them that is lined with an electrically-conductive coating sandwiched between relatively high dielectric media to electrically isolate and shield internal parts of the receptor assembly from receiving a lightning strike directly.

22 Claims, 10 Drawing Sheets

(56) References Cited

U.S. PATENT DOCUMENTS

| | | |
|---|---|---|
| 2006/0280613 A1 | 12/2006 | Hansen |
| 2008/0073098 A1 | 3/2008 | Llorente Gonzalez et al. |
| 2008/0095624 A1 | 4/2008 | Lewke |
| 2008/0181775 A1 | 7/2008 | Livingston et al. |
| 2008/0193292 A1 | 8/2008 | Stam et al. |
| 2008/0232020 A1 | 9/2008 | Dahl et al. |
| 2008/0240925 A1 | 10/2008 | Kita et al. |
| 2009/0053062 A1 * | 2/2009 | Arinaga et al. ........... 416/146 R |

FOREIGN PATENT DOCUMENTS

| | | |
|---|---|---|
| DE | 4440744 A1 | 5/1996 |
| DE | 102005017865 A1 | 11/2006 |
| DE | 102005061679 B3 | 1/2007 |
| EP | 0707145 A1 | 4/1996 |
| EP | 0718495 A1 | 6/1996 |
| EP | 1522725 A2 | 4/2005 |
| EP | 1577551 A2 | 9/2005 |
| EP | 2019204 A1 | 1/2009 |
| JP | 2005151749 A | 6/2005 |
| JP | 2005302399 A | 10/2005 |
| JP | 2006070879 A | 3/2006 |
| JP | 2007138765 A | 6/2007 |
| JP | 2008115783 A | 5/2008 |
| WO | 9425752 A1 | 11/1994 |
| WO | 9607825 A1 | 3/1996 |
| WO | 2005031158 A2 | 4/2005 |
| WO | 2005050008 A1 | 6/2005 |
| WO | 2007059600 A1 | 5/2007 |
| WO | 2007062659 A1 | 6/2007 |
| WO | 2007128314 A1 | 11/2007 |
| WO | 2007134599 A1 | 11/2007 |
| WO | 2008046186 A1 | 4/2008 |
| WO | 2008101506 A2 | 8/2008 |

* cited by examiner

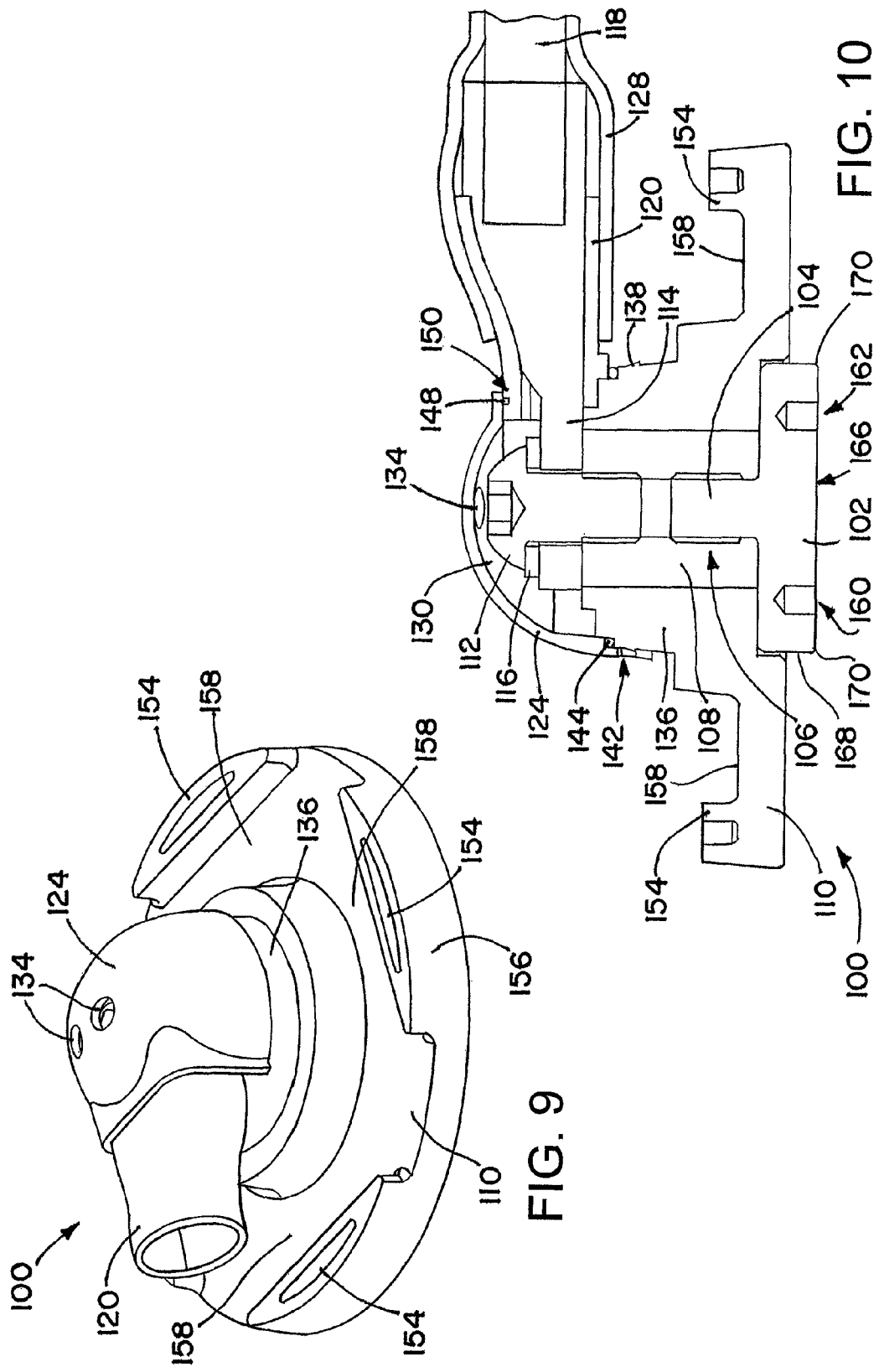

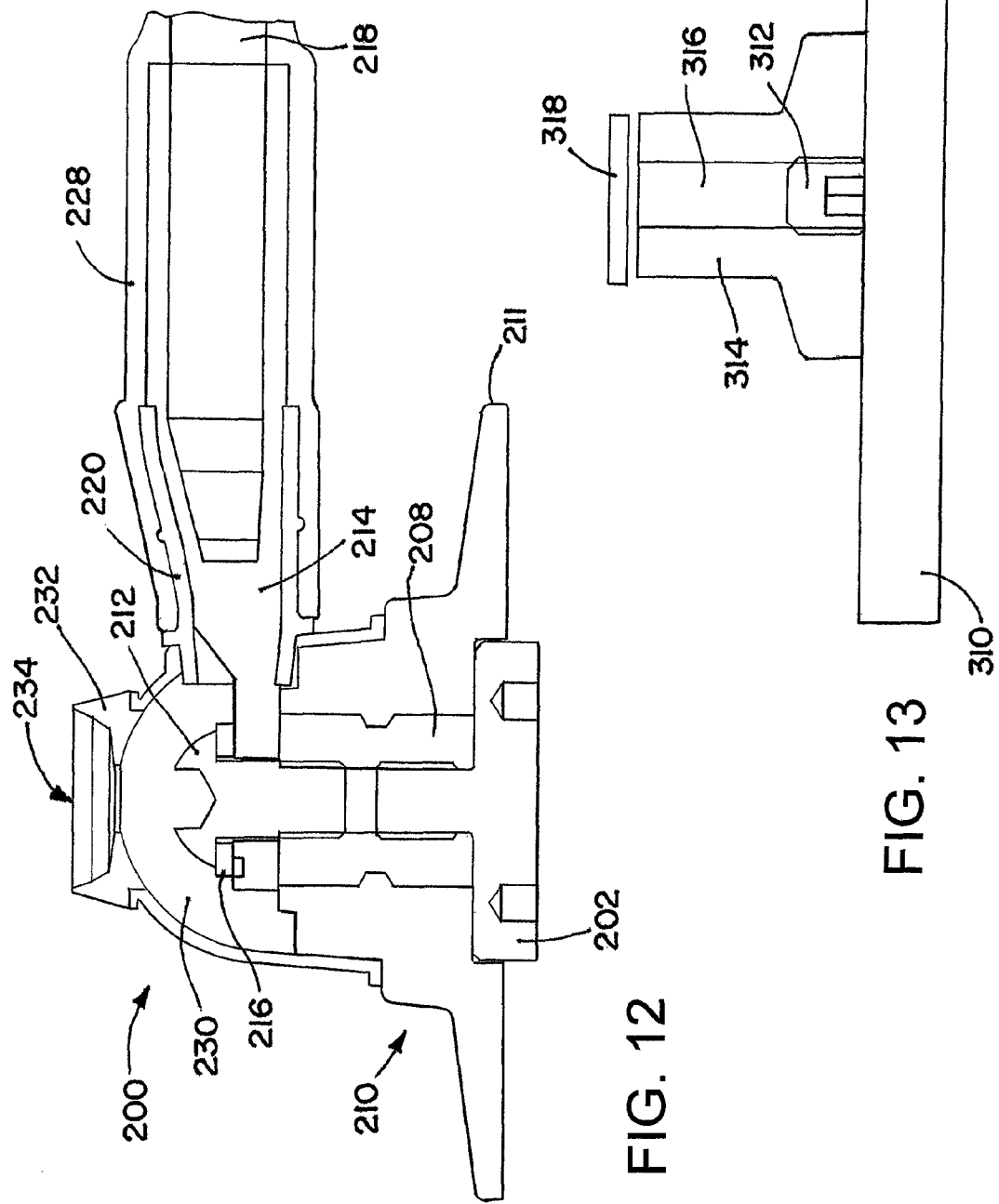

RECEPTOR FOR WIND TURBINE BLADE LIGHTNING PROTECTION

This application claims priority under 35 USC 119 to U.S. Provisional Application No. 61/366,996, filed Jul. 23, 2010.

BACKGROUND OF THE INVENTION

1. Field of the Invention

This invention is in the field of lightning protection for wind turbine blades and other objects.

2. Description of the Related Art

At present there are three primary methods proposed in the industry for protecting wind turbine blades from lightning strikes: tip receptors, surface receptors, and blade coverings.

Tip receptors are typically a cylindrical conductor that protrudes through the distal fin of the blade or a conductive end cap on the distal fin, which matches the blade profile. Some of these receptors are equipped with condensation drains. They are always connected to an earthing conductor, or earthing electrode, running laterally through the cavity of the turbine blade terminating at the blade root. Some configurations use an anchoring block, known as a receptor block, located within the blade cavity some distance beneath the tip as an electro-mechanical bonding junction for the receptor and earthing conductor. Tip receptors are sometimes proposed in conjunction with surface receptors.

Surface receptors are conductor assemblies with an exposed face aligned to the exterior surface of the blade. The body of the external facing receptor disk is recessed into the blade wall occasionally extending into the blade cavity. The exposed face is usually circular, while the shapes of the bodies vary. Methods for attachment also vary, but typically surface receptor disks are partially encased in the blade wall and fastened into a receptor block. Surface receptors are often placed on the pressure and suction sides of the blade, and there can be several of them at various points along the length of the blade. The number of surface receptors is often dependent upon the length of the blade. They are connected to a root earthing conductor either directly, through branch conductors, or through electrical bus-like junctions such as a receptor block. Blade protection designs augmented with either diverter strips or conductive blade coverings have been proposed in conjunction with these receptors as a means of channeling the lightning to the receptor.

Blade coverings are typically conductive layers that cover the surface of the blade. The layers may be continuous solids, meshes, or cured resins. They are applied in sheets, strips or patches. The conductors may be placed on the surface or just below a surface coating.

Wind turbine blades are most commonly made of glass fiber reinforced plastic (GFRP/FRP), which is more commonly known as fiberglass. Even though fiberglass is non-conductive, blades are common attachment points for lightning strikes. With the introduction of blade lightning protection systems, internal conductive components of the blade lightning protection system are competing with the receptors as the strike termination point. Lightning damage to wind turbine blades can occur in several ways: 1) an upward leader originating from an object within the blade instead of the external face of a receptor; 2) "tracking" or shift in the attachment point during the lightning conduction phase; 3) side-flash or arcing within the blade during the lightning conduction phase; and/or 4) damage or fatigue has also been reported due to streamer currents in the pre-lightning attachment phase.

Being the less conductive object, the fiberglass shell and structural reinforcement, or spar, acts as an invisible skin for the lightning protection skeleton. The conductive objects become "stressed" as the electrical field intensifies in conditions suitable for lightning. Three main factors affect the field stress around a conductive object: 1) orientation of the object with respect to the electrical field, 2) position of the object with respect to neighboring conductive objects, and 3) geometry of the conductive object. Conductive objects enter a phase known as corona when the localized electrical field stress intensifies to a sufficient threshold. The next progression from corona is streamer initiation. Streamer initiation can escalate to upward leader initiation. A conductive path is formed and electrons begin to flow once an upward leader attaches to a downward stepped leader emanating from overhead clouds. This process describes downward initiated lightning, or cloud-to-ground lightning.

Lightning damage to installed blades has led some in the industry to draw the conclusion that current practices fail to adequately deter the initiation of upward leaders from conductive elements of the receptor, or more specifically, the internally mounted lightning protection system components. Current receptors typically do not insulate the internal receptor components or connections with anything other than bonding paste and/or the resin that is used to bond the glass fiber. Recognizing the shortfall in wind turbine blade lightning protection systems, a new international standard, IEC 61400-24, "Lightning Protection for Wind Turbines," has been ratified to address criteria for blade components and systems, including receptors.

Insulating the receptor block and cable connections by surrounding or encapsulating the conductive components in a relatively high dielectric strength medium may not be sufficient to prevent these internal components from generating upward leaders. Vestas Wind Systems A/S details such an approach in published patent applications WO 2008/101506 and WO 2007/128314 (AU AU2007247617).

It will be appreciated that further improvements in this field of endeavor would be desirable.

SUMMARY OF THE INVENTION

According to an aspect of the invention, the combined and coordinated use of relatively high dielectric strength insulating mediums and conductive or semi-conductive coatings effectively reduce the localized electrical field stress of the conductive objects used to secure the earthing electrode.

According to another aspect of the invention, a non-conductive, removable covering and cap with a conductive or semi-conductive internal coating is used for one or more of the following purposes: 1) electrically shielding the components within its boundaries, 2) bringing the covering's internal surface and the components within its boundaries to an equipotential state for the purpose of lowering field stress below what would be expected if the internal object(s) were left exposed in an unshielded state, 3) providing a dielectric barrier between the enclosed receptor connection assembly and neighboring conductive objects, and 4) serving as a boundary for a dielectric medium used to fill any internal voids for the purpose of enhanced electrical isolation.

According to yet another aspect of the invention, integral tabs in the receptor block insulator allow for direct mounting to the internal wind turbine blade cavity wall through the use of fiberglass strips/loose rovings, resins, and bond paste.

According to still another aspect of the invention, the shape of the mounting tabs and their position relative to other features of the receptor block insulator provide both a means of retention for the fastening medium and an anti-rotation anchoring for the receptor block assembly.

According to a further aspect of the invention, use of a grommet serves as an electrically isolating transition barrier for the earthing conductor lead exiting the electrically isolated connection chamber.

According to a still further aspect of the invention, a receptor assembly includes one or more of the following: a receptor disk (also known as a puck or plug); an insulating disk or receptor block insulator, which may have tabs; a receptor block; a washer; a threaded fastener; an insulating cover; and a fastener cap. An opening in the insulating cover may receive a compression lug and/or a grommet (which may be around part of the compression lug). A shaft of the threaded fastener may be passed through the washer, and/or may engage the receptor block, securing the compression lug to the receptor block. A threaded stud of the receptor disk may threadedly engage an opposite end of the receptor block, thereby electrically connecting the receptor disk to the compression lug. The receptor block may be secured in a central opening in the receptor block insulator. A conductive or semi-conductive coating may be provided on surfaces of the receptor block, the receptor block insulator, the insulating cover, and/or the fastener cap for example to provide conductive material at least partially surrounding the end of the compression lug that is within the insulating cover. The receptor block assembly may be secured relative to a hole or cavity in a turbine blade using bond paste on the underside and around the perimeter and fiberglass strips and/or loose rovings that are laid across a surface of the receptor block insulator and an inner surface of the wall of the wind turbine blade; with the receptor block assembly so secured the tabs may aid in preventing rotation or other dislodgment of the receptor assembly, and/or a top surface of the receptor may be substantially flush with an outer surface of the turbine blade. The fastener cap may be mechanically coupled to the insulating cover, enveloping at least part of a head of the threaded fastener.

According to another aspect of the invention, a receptor assembly for lightning protection of a wind turbine blade (or another article) includes: an electrically conductive receptor disk; and an insulating disk or receptor block insulator mechanically coupled to the receptor disk. The insulated receptor block may be used to couple the receptor assembly to the blade, such as with bond paste on the underside and around the perimeter and fiberglass strips and/or loose rovings that pass along tabs of the receptor block insulator that prevent the receptor assembly from being rotated or otherwise dislodged from a mounting hole in the blade. A surface of the receptor disk may be substantially flush with an outer surface of the blade. The receptor disk may be electrically coupled to a lug. The coupling between the receptor disk and the lug may be via a receptor block, at least part of which is in the receptor block insulator. An end of the lug may be enclosed within a cavity defined by a bottom surface of the receptor block insulator, an insulating cover that is mechanically coupled to the receptor block insulator, and a fastener cap that is mechanically coupled to the insulating cover. At least one of a bottom surface of the receptor block insulator and/or an inner surface of the insulating cover, and/or an inner surface of the fasterner cap, and/or the internal face of the receptor block may be coated with a conductive or semi-conductive material. The cavity may be filled with a potting material, such as an epoxy.

According to yet another aspect of the invention, a method for securing a receptor assembly to a turbine blade includes the steps of: bonding a receptor assembly relative to a mounting hole or receptor cavity in the blade; and using bonding paste and/or strips of material to secure an insulator block of the receptor assembly to an inside of a wall of the turbine blade. The placing may include positioning the receptor assembly with an outer surface of a receptor disk of the receptor assembly substantially flush with an outer surface of the turbine blade. The strips may be fiberglass strips and/or loose rovings. The strips and/or loose rovings may be placed inside of protruding tabs of the insulator block, with the tabs thereby preventing rotation of the secured receptor assembly relative to mounting hole or receptor cavity. The strips and/or loose rovings may or may not be used in conjunction with bonding paste or an impregnating resin.

According to still another aspect of the invention, a receptor assembly for lightning protection of an object includes: a receptor disk configured to be placed on a surface of the object; a receptor block insulator having a hole therethrough; a receptor block in the hole; and a cover that engages the receptor block insulator. The receptor and the receptor block are made of electrically conductive materials. The cover and the receptor block insulator define a chamber between them. The chamber is surrounded by an electrically-conductive coating on an inside of the cover, on an inside surface of the cap, on a surface of the receptor block that faces the chamber, and on a surface of the receptor block insulator that faces the chamber.

According to a further aspect of the invention, a wind turbine blade includes: a wind turbine blade body; and a lighting receptor assembly installed on the wind turbine blade body, wherein the lightning receptor assembly includes an electrically-conductive receptor disk, and wherein a face of the receptor disk is the only electrically-conductive part of the receptor assembly that is externally accessible to lightning that hits the wind turbine blade. There is a gap between the receptor disk and a receptor-receiving opening in the wind turbine blade body.

According to a still further aspect of the invention, a method of installing a receptor assembly on a device includes: threading a set screw onto an installation plug that is then secured to a mold, wherein the installation plug has a plug threaded hole that threadedly engages the set screw; forming a wall of the device on the mold, around the installation plug; placing an alignment pin in the plug threaded hole; attaching a receptor block insulator and a receptor block of the device to the device, with the attaching including placing the receptor block around the alignment pin, with the alignment pin in a receptor block threaded hole of the receptor block; removing the device from the mold; rotating the set screw within the plug threaded hole, the rotating including 1) pushing the alignment pin to bottom out against a screw of the receptor block assembly, and 2) after the alignment pin is bottomed out, ejecting the installation plug, thereby leaving a receptor cavity in the device; and inserting a receptor disk into the receptor cavity, wherein the inserting includes threadedly engaging the receptor disk with the receptor block threaded hole.

According to another aspect of the invention, a method of installing a receptor assembly on a device includes one or more of the following: applying a mold release compound to an exterior of an installation plug; threading a set screw into the installation plug; applying an adhesive masking tape to the perimeter of the face of the installation plug that comes into contact with the mold wall (this serves multiple purposes: a) securing the plug to the mold wall at a defined location; b) preventing vacuum drawn resin from entering the plug threaded hole from the underside; c) preventing resin from curing between the exterior face of the plug and the blade wall, which would effectively encapsulate the plug and prevent its removal); constructing a device, such as a wind turbine blade wall, around the plug; covering the internal face of the installation plug with adhesive masking tape, which seals the other end of the plug threaded hole from resin ingress; sealing the mold and infusing the device with resin; curing the resin; removing the adhesive masking tape from the internal face of the installation plug to expose the plug threaded hole; inserting the alignment pin into the plug threaded hole of the installation plug; coating the underside perimeter of the receptor block insulator with bonding paste; placing a receptor block assembly onto the alignment pin; rotating the receptor block assembly into an orientation conducive to connecting the conductor lead (branch conductor) to the root down conductor at the pre-defined orientation; surrounding the perimeter of the receptor block insulator with bond paste filling any gaps between the underside of the receptor block insulator and the device (inner blade wall); adhering fiberglass strips and/or loose rovings around the perimeter of the central circular boss of the receptor block insulator, extending from the internal face of the receptor block assembly onto the internal blade wall; curing the fiberglas strips or loose rovings; closing the blade; removing the device from the mold; removing the adhesive masking tape from the external face of the installation plug; rotating the set screw within the installation plug threaded hole, wherein the rotating includes 1) pushing the alignment pin to bottom out against a receptor screw of the receptor assembly that is in the receptor, and 2) after the alignment pin is bottomed out, ejecting the plug, thereby leaving a receptor disk cavity in the device; and inserting a receptor into the receptor disk cavity, wherein the inserting includes threadedly engaging the receptor with the receptor block threaded hole.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed scale drawings show various features of the invention.

FIG. 9 is an oblique view of a receptor assembly in accordance with another embodiment of the invention.

FIG. 10 is a cross-sectional view of a receptor assembly in accordance with another embodiment of the invention.

FIG. 12 is a cross-sectional view of the receptor assembly of FIG. 11.

FIG. 13 is a cross-sectional view showing a first step in a method of installing a receptor assembly, in accordance with an embodiment of the invention.

DETAILED DESCRIPTION

Figure 1:
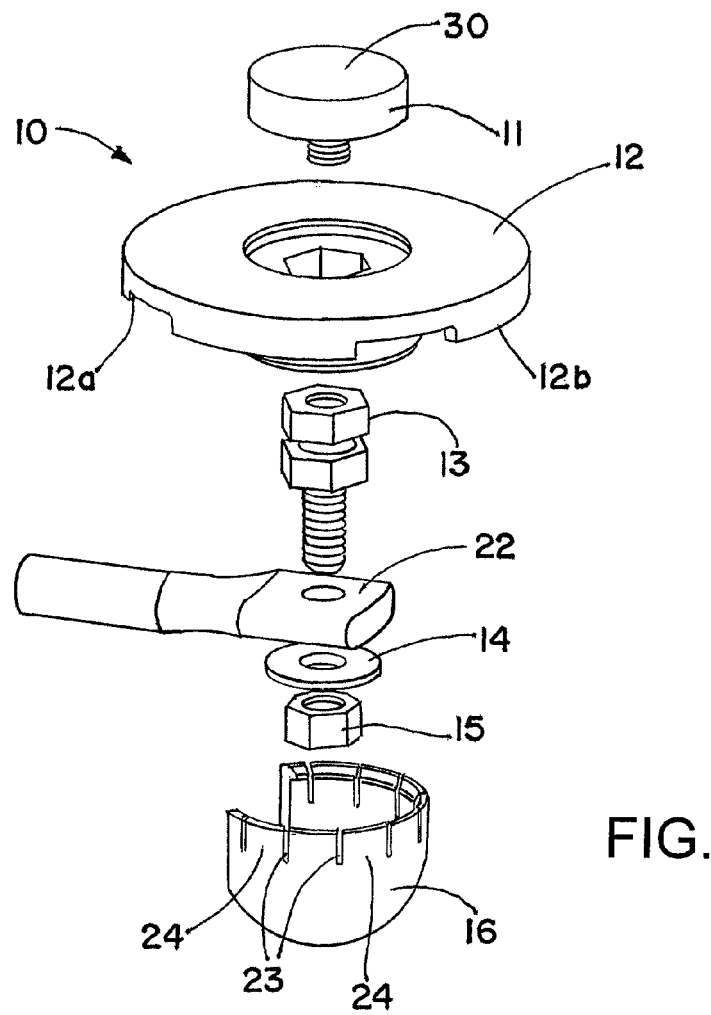
FIG. 1 is an exploded view of a receptor assembly or system in accordance with an embodiment of the present invention.

A receptor assembly for lightning protection of an object, such as a wind turbine blade, includes a receptor disk configured to be placed on a surface of the object, a receptor block insulator with an integral receptor block, a cover that engages the receptor block insulator, and a cap that engages the cover. The receptor disk and the receptor block may be made of electrically conductive materials, and the cover and the cap and the receptor block insulator may define a chamber among them that is lined with an electrically-conductive coating sandwiched between relatively high dielectric media to electrically isolate and shield internal parts of the receptor assembly from receiving a lightning strike directly.

The receptor system that is subsequently described is configured to minimize electrical field stress of the internally conductive connection components by addressing the relative geometries of conductive objects and altering the field apparent shape of these objects. The end result is that the externally facing receptor has the highest electrical field stress making it the most likely attachment point. Furthermore, the internal components are configured in such a manner that when exposed to an electrical field of a magnitude suitable for lightning activity their localized field stress is minimized, reducing the probability that they will enter the corona phase—thus they are unlikely to initiate an upward leader.

Unlike many other known receptor systems, this receptor system described herein employs a connection chamber that employs a conductive layer sandwiched between two dielectric materials. The chamber also encloses and electrically shields the sharp edges of the earthing conductor cable lugs. A conductive coating is applied in a controlled manner across the receptor block insulator, the exposed face of the receptor block, and the internal surfaces of the insulating cover and cap. The configuring of the connection chamber and the application of the coating are done in such a manner that none of the coating is exposed. This creates a chamber wherein the sharp edges of the conductive objects, such as the palm of an earthing conductor lug, are transformed into a smooth, continuous, equipotential shape that results in a lower field stress, i.e. a region less likely to initiate an upward leader when exposed to the electrical field associated with a lightning strike There are other factors that also contribute to the successful performance of a wind turbine blade lightning receptor such as that described herein. The first factor for shielding internal components is having an external facing receptor disk with a perimeter that exceeds the receptor block below it. In this configuration, the receptor is shielding or reducing the e-field to the internal components beneath. Second, the receptor block should, as much as possible, be encapsulated in a relatively high dielectric strength medium. The means by which the earthing conductor cable is fastened to the receptor block should have as low a profile as possible. With all of these conductive elements, their external profiles should be smooth and rounded, keeping sharp edges to a minimum. Third, the cable lug and conductor extending from the receptor should also be encapsulated in a dielectric sheath.

Figure 2:
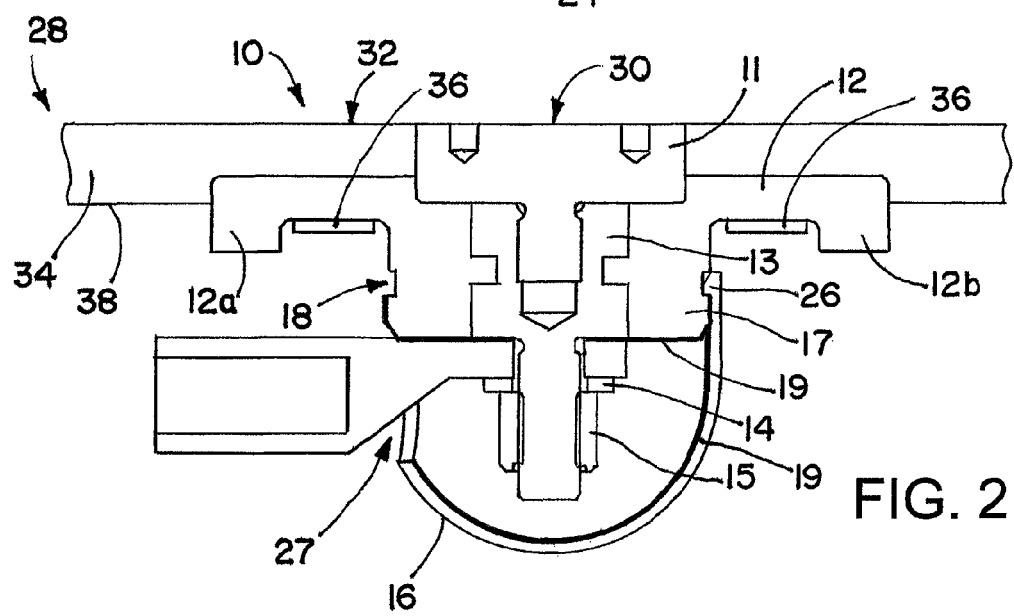
FIG. 2 is a side sectional view of the receptor assembly or system of FIG. 1.

With reference now to FIGS. 1 and 2, a receptor assembly 10 is made up of the following components: a receptor disk 11, a receptor block insulator 12, a receptor block 13, a flat washer 14, a lock nut 15, and an insulating cap 16.

The receptor disk 11 is a metallic disk with an integral threaded stud and blind holes, which engage a standard face spanner wrench. It can be installed or removed from the exterior of the blade. The male threaded stud mates with the female threads of the receptor block 13. The receptor can be secured or removed by engaging a spanner wrench into the corresponding bores in the disk and turning the receptor. A thread locking compound could be used to combine with the tension formed by the installation torque to prevent the receptor from loosening. The receptor disk 11 may be of stainless steel, or another suitable electrically conductive material.

The receptor block 13 is a metallic receptacle and stud combination serving as a common anchoring and electrical bus for attaching the strike termination (receptor disk) and the earthing electrode via a bolted connection. The receptor block 13 may be made of stainless steel or another suitable electrically-conductive material. The receptor block is molded into the receptor block insulator 12. The receptor block 13 is a hexagonal body containing an external facing female thread and an internal facing male stud. The remainder of the body is configured to prevent the receptor block from rotating or translating when torsional loading is applied to its male and female threads during the installation of the receptor and earthing electrode, respectively.

The receptor block insulator 12 is a non-conductive mount, for example being made of a thermoplastic or another suitable electrically-insulating material. It houses and insulates the receptor block 13 while serving as the mounting interface through which the receptor assembly is secured to the interior of the wind turbine blade. Integral tabs, such as shown at 12a and 12b, serve the purpose of guiding and constraining strips of resin bonded fiberglass and/or loose rovings used to fasten the receptor assembly to the blade. The tabs are shaped and arranged to encourage bonding strips and/or loose rovings being applied in a square cross-hatch pattern. This provides an advantage in that the receptor assembly will be constrained so as to prevent translation and rotation about the X-, Y-, and Z-axes. The receptor block 13 also serves as a mount for the insulating cover 16. The bottom edge of a central, circular boss 17 is chamfered or filleted to ease the installation of the cap 16. The circular boss 17 contains a groove 18 that serves as a retention feature for the insulating cap 16. A conductive or semi-conductive coating 19 is applied to the underside of the receptor block 13 and the receptor block insulator 12. The coating 19 is applied to all exposed surfaces starting at the edge of the insulating cap retention groove 18, continuing along the chamfered edge and covering the circular exposed face of the boss including the exposed face of the receptor block 13. This brings all of these surfaces to the same electrical potential. The diameter of the circular boss 17 is selected to create an interference fit with the coated interior walls of the insulating cap 16, creating electrically continuous intimate contact between the conductive coatings on the receptor block insulator 12 and the cap 16.

The insulating cover 16 is a non-conductive covering, for example being made of the same materials as the insulating disk or receptor block insulator 12 (e.g., thermoplastic). The conductive or semi-conductive coating 19 is applied to the inside surface of the cover 16. The cover 16 is dome-shaped so as to create a smooth, continuous, conductive surface. Once installed, this smooth conductive surface surrounds the exposed surfaces of the receptor block 13, the washer 14, the lock nut 15, and significant portions of an earthing electrode attachment 22. Physical contact between the coating 19 on the receptor block insulator 12 and the insulator cover 16 places all of these conductive elements at the same voltage potential. The ambient electrical field then interacts with these components as a single lumped electrical mass with the shape of the outermost surface, in this case the smooth dome-like shape of the insulating cap. The geometry of this shape combined with its being at the same voltage potential as other conductive objects within its boundaries reduces the electrical field stress when the surrounding electrical field reaches magnitudes suitable for lightning activity thus reducing the probability for the initiation of an upward leader. The cover 16 has thin slits 23 evenly spaced about the perimeter of its open end. This creates a ring of finger-like tabs 24. The closed ends of the slits 23 are rounded to minimize mechanical stress thus reducing the likelihood of mechanical fracture originating at the slit 23 when the tabs 24 are exposed to the mechanical loads associated with the installation of the cover (cap) 16. There is an internal ridge 26 around the inner perimeter of the tabs 24. The ridge 26 is relieved to match the chamfer on the receptor block insulator 12. The relieved face on the tabs 24, the slits 23 in the perimeter of the dome, and the chamfered face on the receptor block insulator 12 serve to facilitate installation by gradually spreading the finger-like tabs 24 as the cover 16 is pressed onto the insulator 12. The cover 16 is pushed to the point where the ridge 26 on the tabs 24 enters the mating groove 18 on the receptor block insulator 12 allowing the tabs 24 to snap back to their natural position. The ridge 26 and the corresponding groove 18 work to create interference, retaining the cover 16 on the insulator 12. An opening 27 is provided in the cover 16 to allow access for the earthing electrode. This also serves as a leverage point to facilitate removal of the cover. The exterior face of the cover 16 remains non-conductive providing enhanced electrical isolation from neighboring conductive components.

As discussed above, a conductive or semi-conductive coating 19 may be applied to the underside of the receptor block 13, its insulator 12, and the inner surface of the non-conductive covering 16. The coating 19 may be applied such that none of it is exposed after the assembly of the receptor system and the earthing electrode is complete. The conductive coating could be applied in many ways such as painting and over-molding. Any of a variety of colloidal graphite suspensions or conductive paints may be used as a suitable coating material. In one embodiment, the colloidal graphite suspension coating may have a thickness of 1-10 mils.

With reference to FIG. 2, the receptor assembly may be mounted in a hole in a turbine blade 28, for example with an outer surface 30 of the receptor disk 11 substantially flush with an outer surface 32 of a wall 34 of the turbine blade. Fiberglass strips and/or loose rovings, such as shown at 36, may be laid across a bottom surface of the insulating disk 12 and an inner surface 38 of the blade wall 34, to secure the receptor assembly to the blade wall 34. The tabs 12a and 12b aid in preventing the receptor assembly from rotating or being dislodged from its securement.

One advantage of the receptor assembly described above is making the receptor block smaller in perimeter than the surface receptor disk, and encapsulating it in a non-conductive, insulating medium, make the receptor the dominant electrical field stress point while electrically shielding the receptor block and mitigating the field stress intensification attributed to the sharp edges required for its anti-twist and anti-upset features.

A second advantage is that masking the sharp edges of the connector assembly components and making them appear as a smooth, continuous, equipotential lumped mass minimizes field stress to the point where the probability for upward leader initiation is minimized thus the potential for damage to the blade from a blade piercing strike is reduced.

A third advantage is that the receptor mount provides integral mounting, retention, and anti-twist features inherently compatible with existing blade manufacturing techniques.

A fourth advantage is that the cover can be removed for assembly or service of the blade electrode connection when the connection chamber is not filled with an insulating medium.

A fifth advantage is that wind turbine blade electrode connections can be electrically isolated from neighboring conductive objects minimizing the potential for internal arcing which could cause subsequent blade damage.

It will be appreciated that many alternatives exist for the various components described above. For instance, the mounting arrangements for the receptor block insulator could be imagined in various arrangements such as loops, hooks, slots, flats on the perimeter, etc. for securing the block to the wind turbine blade and prevent the insulator from rotating or translating. The receptor block insulator surface could be roughened or configured with protrusions to provide additional friction for the purpose of restricting or preventing translation or rotation of the receptor block assembly. The cover retention groove and mating tang on the cover could be rounded or replaced by smooth walls to create a press-fit. The cover retention groove could be replaced by an O-ring groove. An O-ring could then be used to secure the cover to the base while also providing a seal between the two components. Tabs could be provided around the perimeter of the insulator in place of the cover retention groove. These tabs would mate with windows on the insulating cover to retain the cover in an indexable manner.

Further alternatives exist with regard to the receptor block. The receptor block could be made in any number of shapes so long as features were included to prevent the block from rotating or translating with respect to the surrounding dielectric medium. Alternative constructions could be conceived for the receptor block such as a cylindrical body with one flat (D-shape) or a cylindrical body with a knurled exterior. The sharp edges of the hexagonal body may be rounded. The recessed groove shown in the mid-span of the hexagonal body of FIGS. 1 and 2 could be omitted. The receptor block could have any combination of male and female threads such as a continuous female threaded hole or two, separate opposing female threaded holes separated by a barrier. In either of the two latter examples, a bolt could be used to fasten the earthing electrode to the receptor block.

With regard to the insulating cover, the insulating cover could be made from a soft, non-conductive material, such as rubber or a suitable plastic. The cover could be secured with a mechanical or chemical fastening means. The insulating cover could be filled with a non-conductive compound to enhance the electrical insulation around the conductive components in the lower connection chamber such as an epoxy potting compound, an insulating fluid or gel, or an expanding foam. The insulating cover could be any of a variety of suitable smooth, rounded, continuous shapes. The cover could have windows that mate with tabs on the insulator. The cover could have a transition hood with provisions for mating with a grommet. The cover could have vent and port holes to facilitate the introduction of an insulating medium. The cover could have an internal, horizontal ridge or flange that comes to rest on a parallel face on the receptor block insulator boss for the dual purpose of acting as a barrier to the flow of an internal dielectric medium and a interface surface of conductive coatings between the receptor block insulator and the insulating cover to establish electrical continuity between the discreet components.

As another alternative, a grommet could be used to make the transition from the opening in the cover/receptor block insulator assembly to the earthing electrode. The grommet would mate with the cover, receptor block insulator and the earthing electrode and or its attachment appendage (e.g., a lug). The grommet would serve as a containment barrier for insulating medium that could be introduced into the connection chamber. The grommet would also serve as an insulator. The grommet could also serve as an insulation system transition piece from the connection chamber to the earthing electrode's insulation system, if applicable. The grommet could be configured to accommodate a variety of cable lug or other earthing conductor attachment means.

Figure 3:
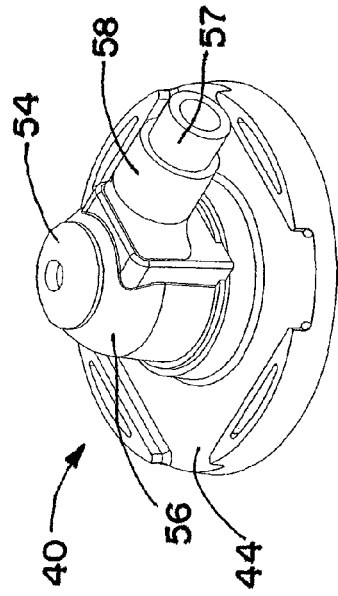
FIG. 3 is an oblique view of a receptor assembly in accordance with yet another embodiment of the present invention.
Figure 5:
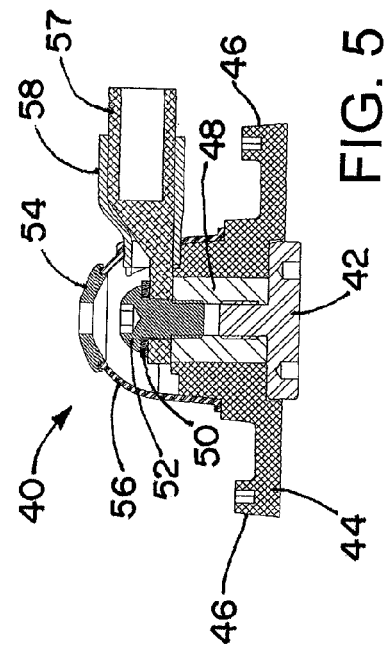
FIG. 5 is a side sectional view of the receptor assembly of FIG. 3.
Figure 4:
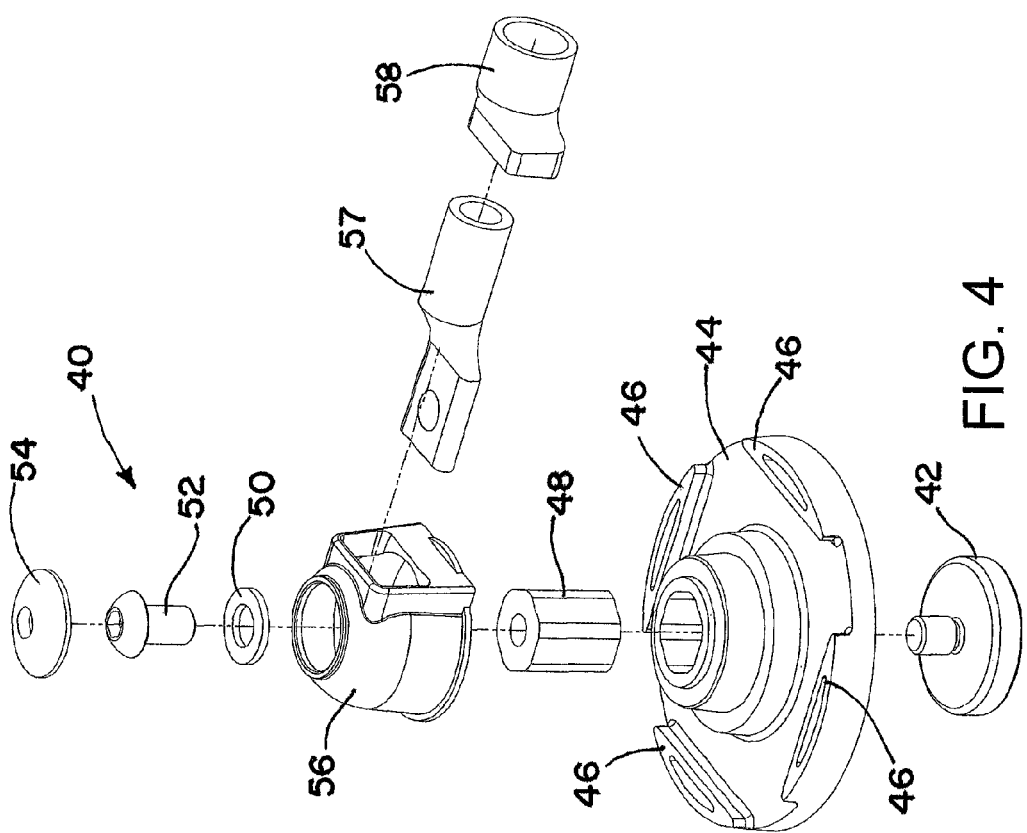
FIG. 4 is an exploded view of the receptor assembly of FIG. 3.

FIGS. 3-5 show an alternative embodiment, a receptor assembly 40 with a receptor disk 42, an insulating disk or receptor block insulator 44 having tabs 46, a receptor block 48, a washer 50, a threaded fastener 52, an insulating cover 56, and a fastener cap 54. An opening in the insulating cover 56 receives a compression lug 57 and a grommet 58. Materials and other features may be similar to those of the other embodiments and variants described above, for example with the bottom surface of the block 44, an inner surface of the cover 56, and an inner surface of the cap 54 having a conductive inner coating.

Figure 6:
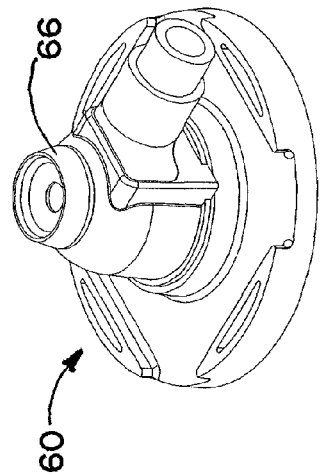
FIG. 6 is an oblique view of a receptor assembly in accordance with still another embodiment of the present invention.
Figure 8:
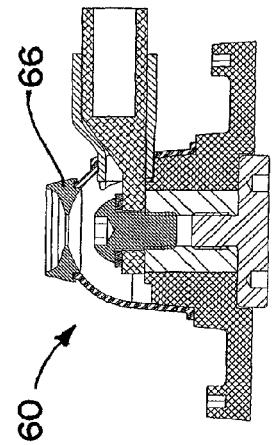
FIG. 8 is a side sectional view of the receptor assembly of FIG. 6.
Figure 7:
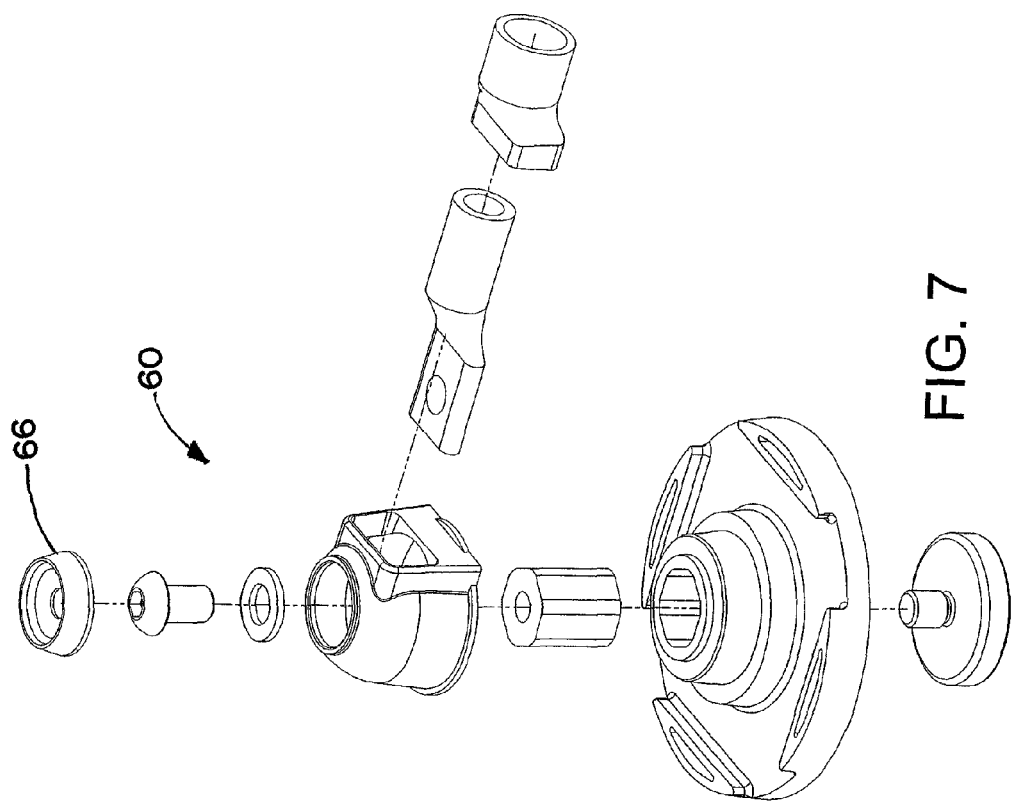
FIG. 7 is an exploded view of the receptor assembly of FIG. 6.

FIGS. 6-8 show another alternative embodiment, a receptor assembly 60. The receptor assembly 60 may be similar to the receptor assembly 40 with the exception of a fastener cap 66 that has a different configuration than the fastener cap 54 (FIG. 3). The fastener cap 66 may act as a reservoir for filling the space enclosed by the cover with epoxy or another suitable dielectric material, allowing compensation from settling and shrinkage of the filling material, such as during drying or curing.

FIGS. 9 and 10 show yet another alternative embodiment, a receptor assembly 100 that includes a receptor disk 102 that has a threaded stem 104 that threadedly engages a threaded hole 106 in a receptor block 108 that is in a receptor block insulator 110. The other end of the threaded hole 108 receives a bolt 112 that couples a lug 114 to the receptor block 108, with a washer 116 between the lug 114 and the head of the bolt 112. The lug 114 is connected to an earthing conductor 118 that carries an electrical charge away from the receptor assembly 100 to an electrical ground (not shown). The lug 114 is enclosed by a grommet 120 where the lug 114 enters an opening in a cover 124. A heat shrink insulation 128 covers the connection between the lug 114 and the earthing conductor 118.

The cover 124 encloses a chamber 130 defined by the cover 124 and the receptor block insulator 110. The chamber 130 may be surrounded by a conductive coating (not shown) on the inner surface of the cover 124, and on surfaces of the receptor block 108 and the receptor block insulator 110 that face the chamber 130. The coating may be similar to conductive or semi-conductive coatings described above with regard to other embodiments, and may aid in making a conductive connection between the lug 114 and the receptor block 108. The cover 124 has holes 134 in its top, to allow the chamber 130 to be filled by a suitable dielectric material, such as an epoxy.

The receptor block insulator 110 has a boss 136 with a ridge 138 on it. The ridge 138 engages a window 142 in the cap 124, to aid in engaging the cover 124 on the boss 136. An O-ring 144 is around the boss 136, located between the boss 136, and the grommet 120 and the cover 124. The cover 124 also has a flange 148 that engages a groove 150 in the top of the grommet 120.

The boss 136 has tabs 154 along its circular perimeter 156. The tabs 154 are used to retain fiberglass strips and/or loose rovings (not shown) laid across flats 158 between the boss 136 and the tabs 154. As described further below, the fiberglass strips and/or loose rovings aid in fixing the receptor block insulator 110 relative to a circular hole or cavity in a device, such as the wall of a wind turbine blade.

The grommet 120 contains a recessed groove around three of the four walls of its perimeter. There is a corresponding tab in the opening of the cover. This serves the purpose of impeding the egress of dielectric compound from the connection chamber.

The receptor disk 102 has a pair of recesses 160 and 162 for receiving protrusions from a suitable wrench (not shown) for threading the receptor disk 102 into the receptor block 110. The receptor disk 102 has a disk-shape exposed surface 166 that has a circular perimeter 168. The perimeter 168 has a rounded edge 170 to minimize the probability of attracting lightning strikes at the outer edge of the receptor disk 102. The rounded edge 170 may be rounded by having a curvature of about 0.8 mm (1/32 inch), such as a curvature from 0.4 mm to 2 mm.

The materials of the various parts of the receptor assembly 100 may be made of materials similar to those of other embodiments described herein. The various features described with regard to one of the embodiments should be considered as combinable with other of the embodiments, where appropriate.

Figure 11:
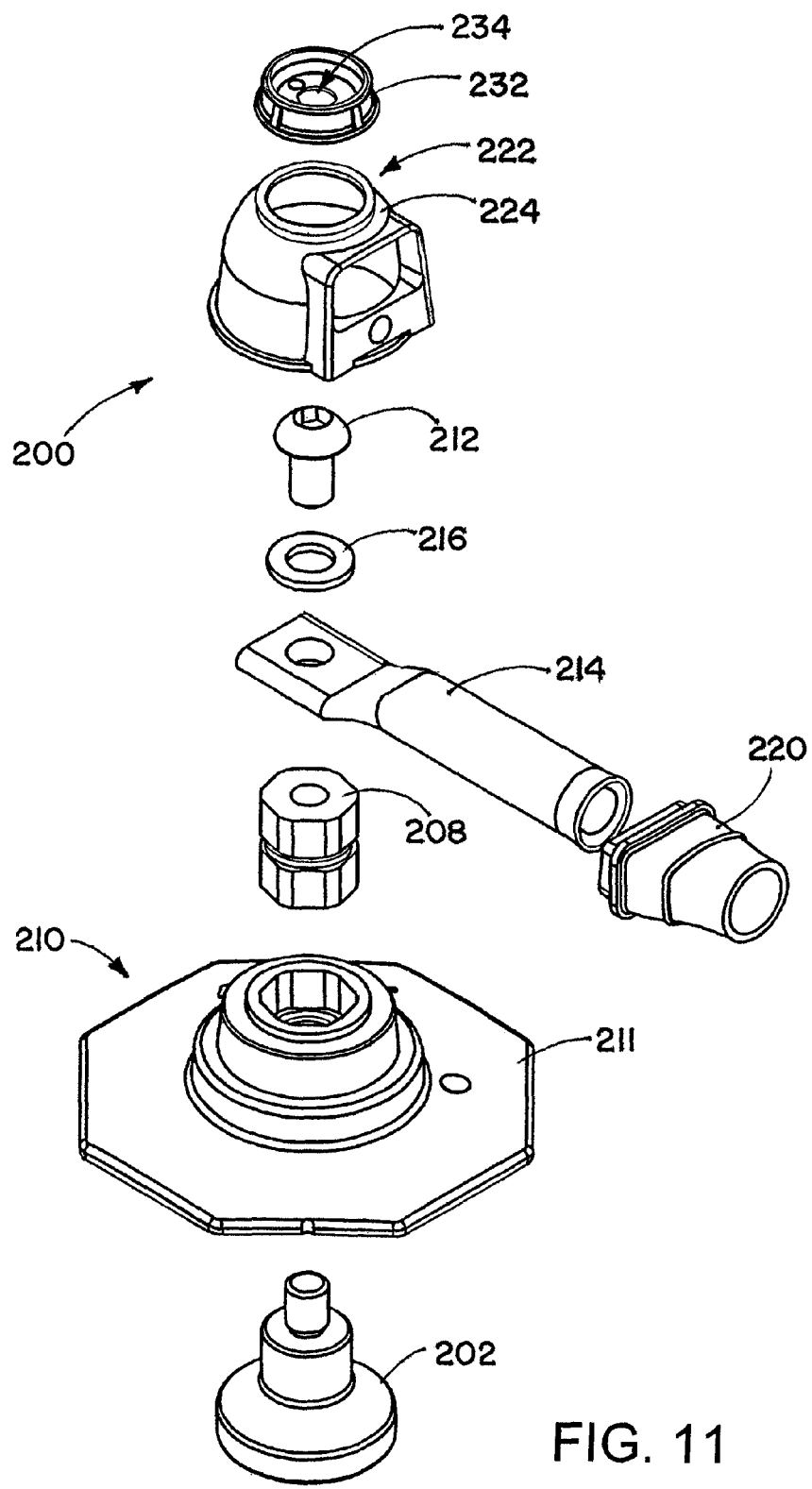
FIG. 11 is an exploded view of a receptor assembly in accordance with a further embodiment of the invention.

FIGS. 11 and 12 show still another embodiment, a receptor assembly 200. The receptor assembly 200 has many features in common with the receptor assembly 100 (FIG. 9), and the description of details of similar features will be omitted with respect to the receptor assembly 200. The receptor assembly 200 has a receptor block insulator 210 having a polygonal perimeter 211. The polygonal perimeter 211 in the illustrated embodiment is an octagon, but other polygons, such as squares, pentagons, hexagons, and decagons, are alternative perimeter shapes. The polygonal perimeter 211 aids in retaining the receptor assembly 200 relative to a receptor disk hole or cavity in the blade wall when used in conjunction with bonding pastes, fiberglass strips, and resins typically used in wind turbine blade construction. The use of the polygonal perimeter 211 is an alternative to the use of tabs, such as the tabs 154 (FIG. 9) to prevent rotation or translation of the receptor assembly 200.

A bolt 212 is used for coupling a lug 214 to a receptor block 208. The bolt 212 is accessible through a hole 222 in a cover 224, and can be inserted through the cover hole 224. A reservoir piece (fastener cap) 232 is engaged with the hole 222. The reservoir piece 232 allows initially overfilling of the chamber 230 with the epoxy of other dielectric filler, which may shrink upon curing. A cap hole 234 in the fastener cap 232 may also be used for inserting epoxy or another dielectric filler in a chamber 230 enclosed by the cover 224 and cap 232. The cap hole 234 allows access to the fastener 212, for instance to allow the fastener 212 to be tightened.

Other parts of the receptor assembly 200 may be similar to corresponding parts of the receptor assembly 100 (FIG. 9). Examples of corresponding parts are a receptor 202, a receptor block 208, a washer 216, an earthing conductor 218, a grommet 220, and heat shrink insulation 228.

The grommet 220 contains a flange around the four walls of its perimeter. This serves the purpose of impeding the egress of dielectric compound from the connection chamber and providing a positive stop for its insertion.

FIGS. 13-20 show steps in installation of a further lightning receptor assembly on a device or apparatus, in the illustrated embodiment a wind turbine blade. FIG. 13 shows the set-up of a blade mold 310. A set screw 312 and a plug 314 are installed on the mold 310 at a location where the lightning receptor assembly is to be placed. The plug 314 has a threaded hole 316 into which the set screw 312 is threaded. The plug 314 is of the same height and profile as the receptor disk of the receptor assembly to be installed, but may be slightly oversized and/or drafted to promote removal of the plug and subsequent installation of the receptor disk. A cover 318, such as masking tape and/or putty, is installed on the top of the plug 314, to keep additional material out of the hole 316, and to keep resin off of the top of the plug 314.

Figure 14:
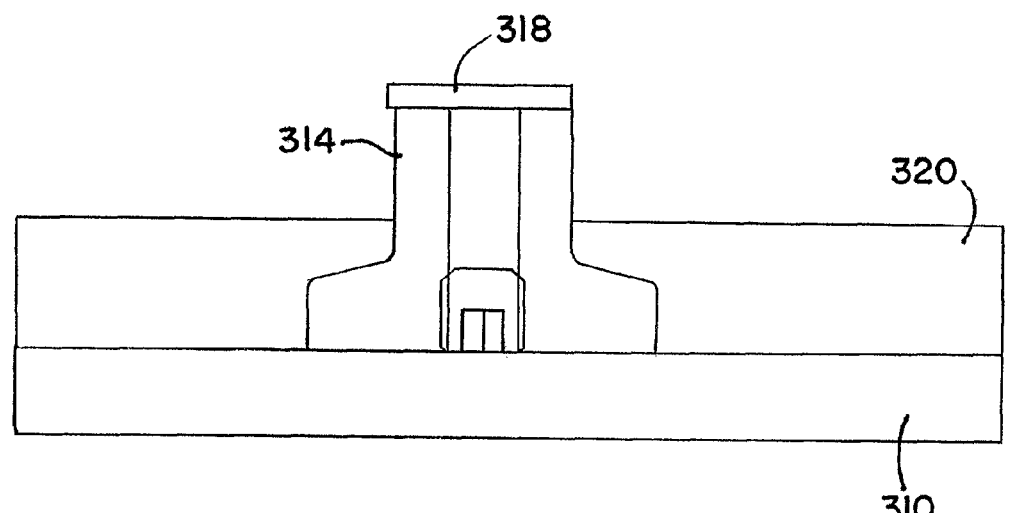
FIG. 14 is a cross-sectional view showing a second step in the method.

FIG. 14 illustrates formation of the blade wall or body 320 on the mold 310, around the plug 314. The blade wall 320 may be formed by placement of multiple layers of structural fiber and multiple layers of reinforcement material. Resin is then drawn into the layers of structural fiber and reinforcement material, and cured to produce the blade wall 320. The cover 318 prevents any resin from getting on the top surface of the plug 314. Such resin could result in a later problem in trying to obtain a good electrical connection between the receptor disk and a receptor block of the receptor assembly.

Figure 15:
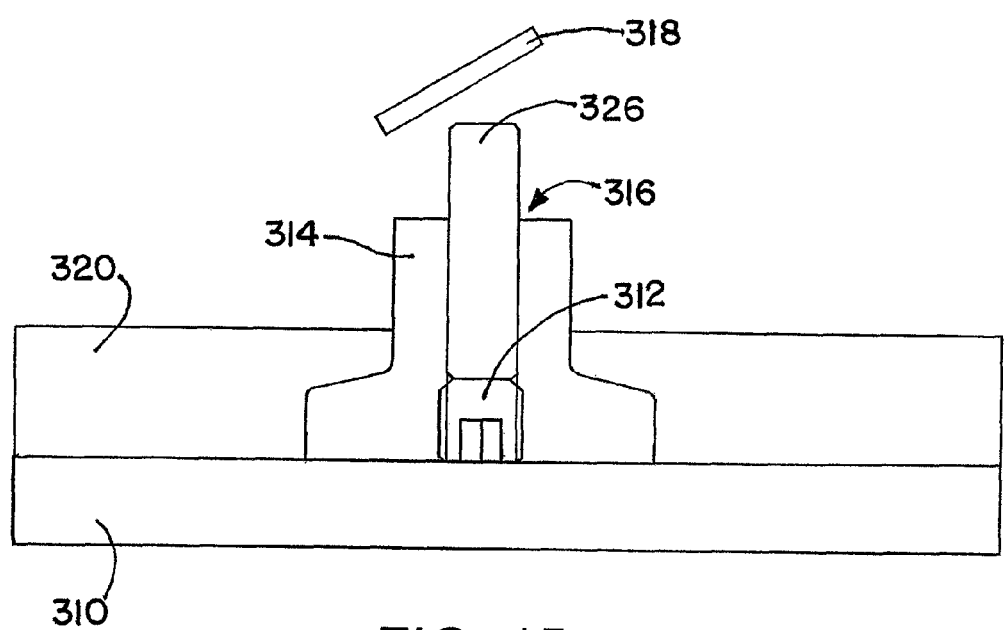
FIG. 15 is a cross-sectional view showing a third step in the method.
Figure 16:
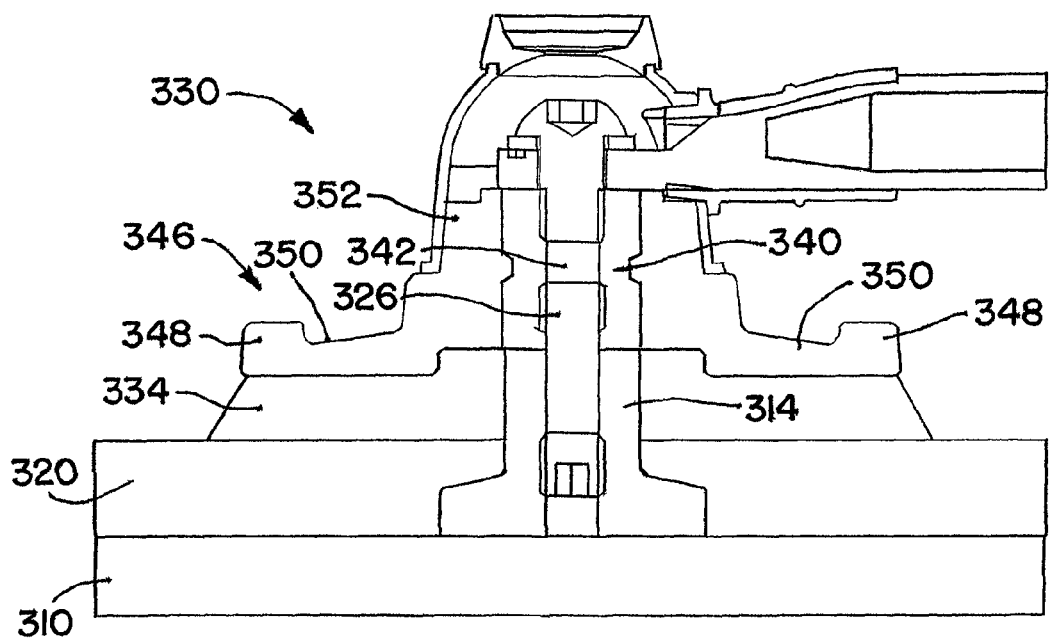
FIG. 16 is a cross-sectional view showing a fourth step in the method.

As shown in FIG. 15, the cover 318 is then removed, and an alignment pin 326 is inserted into the plug threaded hole 316. The alignment pin 326 is unthreaded, and has a diameter slightly smaller than a minimum thread diameter of the hole 316. The pin 326 provides alignment for the placement of the receptor assembly 330, as shown in FIG. 16. Bond paste 334 is installed on the receptor assembly 330, and then the receptor assembly 330 is installed on the blade wall 320. The receptor assembly 330 is installed with a receptor block 340 against the top surface of the plug 314, with the receptor block 340 flush against the plug 314. The alignment pin 326 fits into a threaded hole 342 of the receptor block 340, ensuring proper placement of the receptor assembly 330.

After attachment of the receptor assembly, the receptor assembly 330 is secured against rotation. In the illustrated embodiment, in which a receptor block insulator 346 has a series of tabs or bosses 348, with flats 350 between the tabs 348 and a central boss 352, strips of fiberglass and/or loose rovings (not shown) may be laid across the flats 350. The fiberglass strips and/or loose rovings are impregnated with resin. They are laid across the flats 350, with the ends attached to parts of the blade 320, which may be prepared by application of a thin layer of bond paste.

As an alternative, for a receptor block insulator with no tabs and a polygonal perimeter, such as the receptor block insulator 210 (FIG. 11), a plastic part with a suitable polygonal opening (not shown) is overlaid onto the receptor block 210. Fiberglass strips impregnated with resin may then be overlaid onto the polygonal receptor block insulator, adjacent to the central boss of the insulator.

Figure 17:
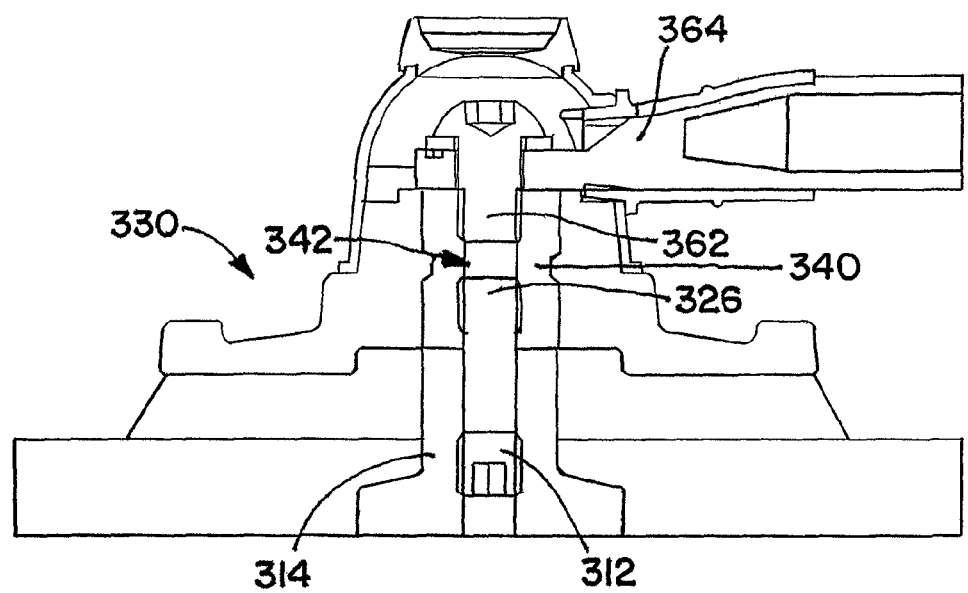
FIG. 17 is a cross-sectional view showing a fifth step in the method.

After securing the receptor assembly 330, the mold 310 is removed, and the set screw 312 is screwed into the plug 314, for instance using an Allen wrench or other suitable tool, as illustrated in FIG. 17. This first forces the alignment pin 326 down further, until the alignment pin 326 bottoms out against a screw or bolt 362 that is threaded into the receptor block hole 342. The screw or bolt 362 holds a lug 364 against the receptor block 340.

Figure 18:
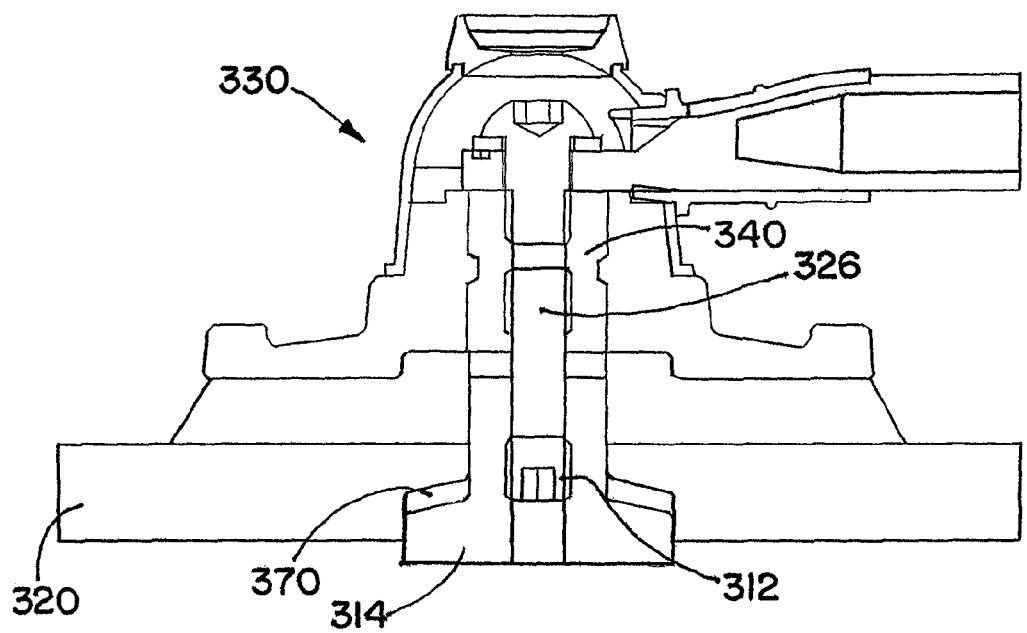
FIG. 18 is a cross-sectional view showing a sixth step in the method.
Figure 19:
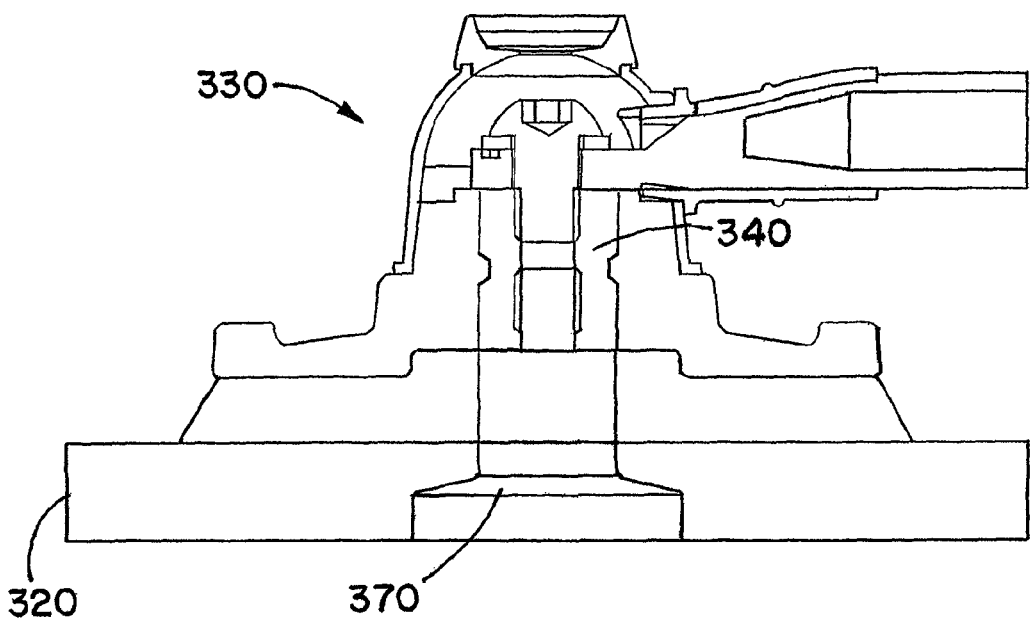
FIG. 19 is a cross-sectional view showing a seventh step in the method.
Figure 20:
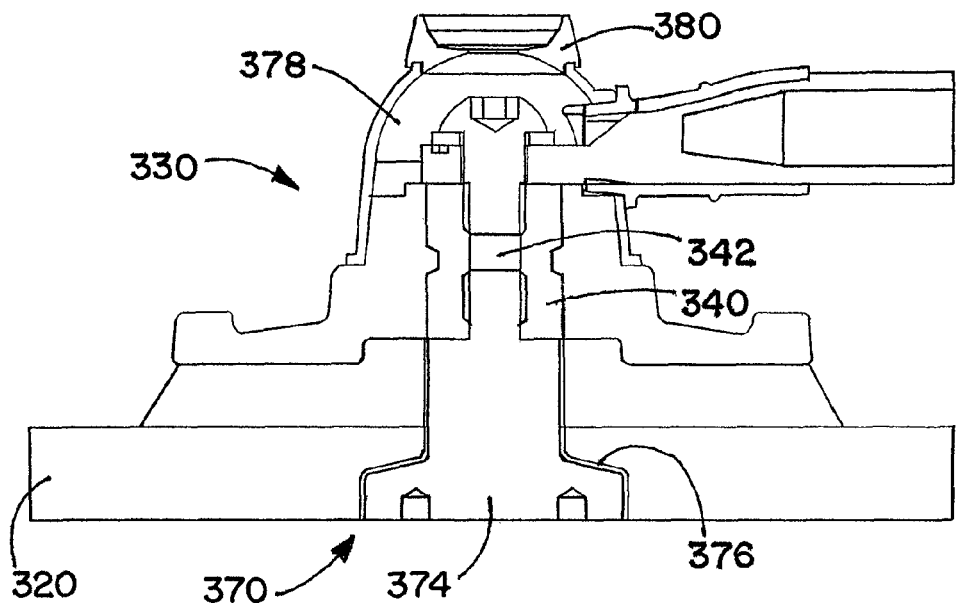
FIG. 20 is a cross-sectional view showing an eighth step in the method.

After bottoming out of the alignment pin 326, continued turning of the set screw 312 causes the plug 314 to move outward, disengaging the plug 314 from the turbine blade 320, as shown in FIG. 18. This allows removal of first the plug 314 and the set screw 312, and then the alignment pin 326. This results in an empty receptor disk cavity 370, shown in FIG. 19. Finally, in FIG. 20, a receptor 374 is threaded into the receptor block hole 342, filling the receptor disk cavity 370. There is a slight gap 376 between the receptor 374 and the receptor disk cavity 370, since the plug 314 (FIG. 13) is slightly oversized, as mentioned above. This is done to accommodate minor variations in the manufacture of receptors, and to ensure proper contact between the receptor disk 374 and the receptor block 340. In a separate step a chamber 378 of the receptor assembly 330 may be filled with epoxy or another suitable dielectric material, for example making use of a reservoir piece 380 of the receptor assembly 330.

Figure 21:
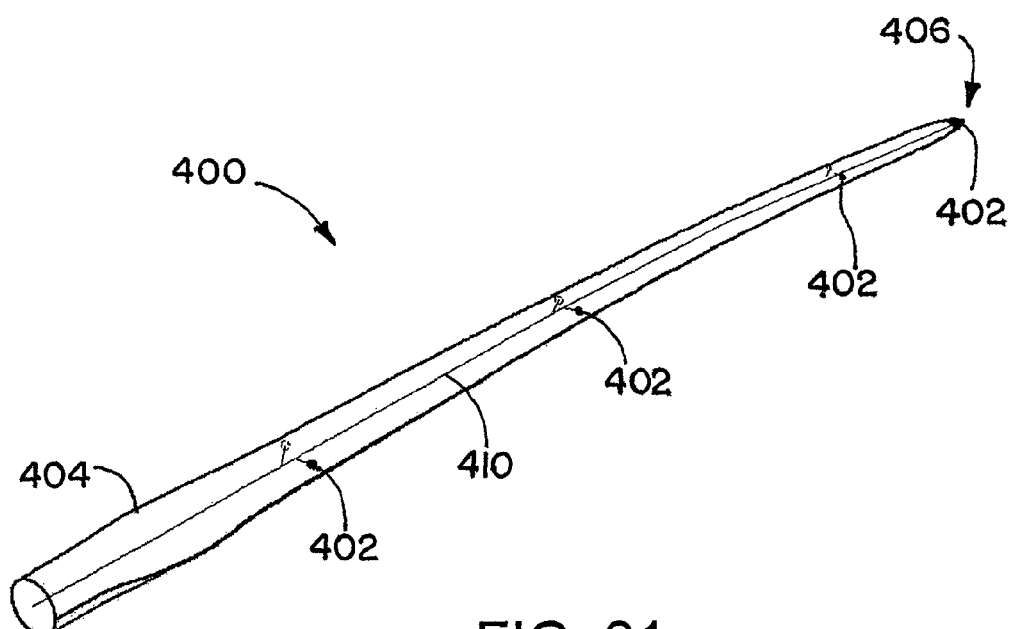
FIG. 21 is an oblique view showing a turbine blade that includes receptor assemblies, in accordance with an embodiment of the invention.

FIG. 21 shows a turbine blade 400 with several receptor assemblies 402 installed at various parts along the length of a turbine blade body 404, and connected to an earthing conductor, 410 including at a tip 406 of the blade 400. The receptor assemblies 402 may have any of the various receptor assembly configurations described above. The receptor assemblies described herein may be installed in a variety of other devices or apparatuses, for lightning protection.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A receptor assembly for lightning protection of an object comprises:
    a receptor disk configured to be placed on a surface of the object;
    a receptor block insulator having a hole therethrough;
    a receptor block in the hole; and
    a cover that engages the receptor block insulator;
    wherein the receptor and the receptor block are made of electrically conductive materials;
    wherein the cover and the receptor block insulator define a chamber between them; and
    wherein the chamber is surrounded by an electrically-conductive coating on an inside surface of the cover, on a surface of the receptor block that faces the chamber, and on a surface of the receptor block insulator that faces the chamber.

2. The receptor assembly of claim 1, further comprising an electrically-nonconducting filler material in the chamber.

3. The receptor assembly of claim 2, wherein the filler material is an epoxy.

4. The receptor assembly of claim 2,
    further comprising a cap that engages the cover;
    wherein the cap acts as a reservoir when filling the chamber with the filling material.

5. The receptor assembly of claim 4, wherein the electrically-conductive coating is also on an inside surface of the cap.

6. The receptor assembly of claim 1, wherein the receptor disk is threadedly engaged with the receptor block.

7. The receptor assembly of claim 1, wherein the receptor disk is the only externally-accessible electrically-conductive component of the receptor assembly, with the receptor and the receptor block insulator preventing access to other electrically-conductive parts of the receptor assembly.

8. The receptor assembly of claim 1, wherein the receptor disk threadedly engages with the receptor block.

9. The receptor assembly of claim 8, wherein surfaces of the receptor disk and the receptor block are flush with one another.

10. The receptor assembly of claim 1,
    further comprising a lug that is received in an opening of the cover;
    wherein the lug is electrically coupled to the receptor and the receptor block.

11. The receptor assembly of claim 10, further comprising a threaded fastener that mechanically couples the lug to the receptor block.

12. The receptor assembly of claim 11, wherein a portion of the conductive coating is between the lug and the receptor block, making an electrical connection between the lug and the receptor block.

13. The receptor assembly of claim 1, wherein the receptor has a disk-shape surface facing away from the receptor block.

14. The receptor assembly of claim 13, wherein the receptor disk has a curved edge, having a curvature of from 0.4 mm to 2 mm, around the perimeter of the disk-shape surface.

15. The receptor assembly of claim 1, wherein the receptor block insulator is a molded plastic piece that is molded around the receptor block.

16. The receptor assembly of claim 1,
    wherein the receptor block insulator has a circular perimeter; and
    wherein the receptor block insulator has tabs outside of where the cover engages the receptor block insulator, with the tabs aiding in preventing dislodgement of the receptor assembly when the receptor assembly is installed on an internal wall of a wind turbine blade.

17. The receptor assembly of claim 1, wherein the receptor block insulator has a polygonal perimeter.

18. The receptor assembly of claim 1, in combination with a wind turbine blade that the receptor assembly is installed on.

19. A wind turbine blade comprising:
    a wind turbine blade body; and a lighting receptor assembly installed on the wind turbine blade body, wherein the lightning receptor assembly includes an electrically-conductive receptor disk, and wherein a face of the receptor disk is the only electrically-conductive part of the receptor assembly that is externally accessible to lightning that strikes the wind turbine blade;

wherein there is a gap between the receptor disk and a receptor-receiving opening in the wind turbine blade body.

20. A method of installing a receptor assembly on a device, the method comprising:

threading a set screw onto an installation plug that is then secured to a mold, wherein the installation plug has a plug threaded hole that threadedly engages the set screw;

forming a wall of the device on the mold, around the installation plug;

placing an alignment pin in the plug threaded hole;

attaching a receptor block insulator and a receptor block of the device to the device, with the attaching including placing the receptor block around the alignment pin, with the alignment pin in a receptor block threaded hole of the receptor block;

removing the device from the mold;

rotating the set screw within the plug threaded hole, the rotating including 1) pushing the alignment pin to bottom out against a screw of the receptor block assembly, and 2) after the alignment pin is bottomed out, ejecting the installation plug, thereby leaving a receptor cavity in the device; and inserting a receptor disk into the receptor cavity, wherein the inserting includes threadedly engaging the receptor disk with the receptor block threaded hole.

21. The method of claim 20, wherein the receptor block insulator has a circular perimeter;

wherein the receptor block insulator has tabs; and wherein the attaching includes using fiberglass strips and/or loose rovings that are laid across a surface of the receptor block insulator and an inner surface of the wall of the device.

22. The method of claim 20, wherein the device is a wind turbine blade.

* * * * *